UNITED STATES PATENT OFFICE.

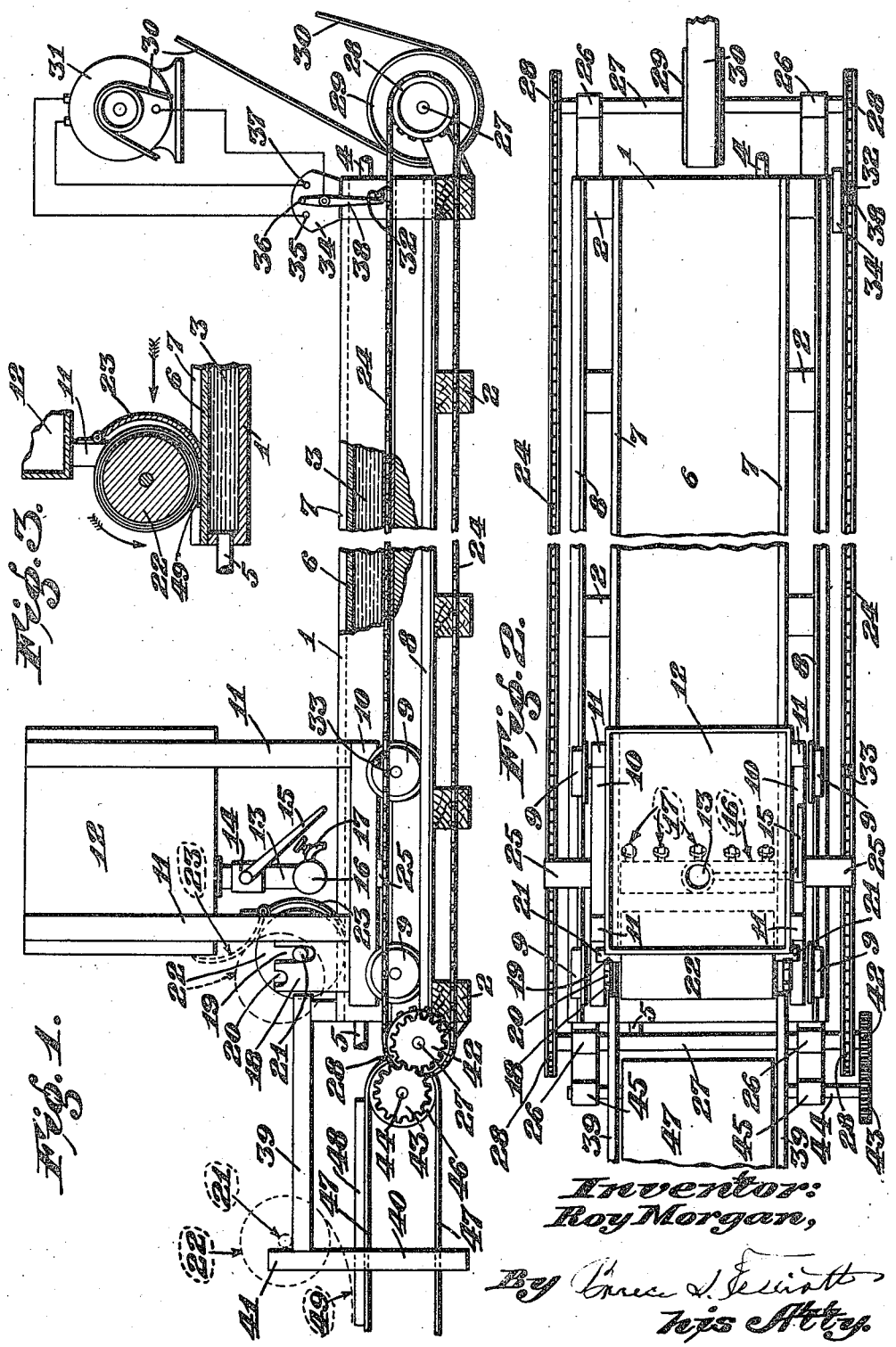

ROY MORGAN, OF ST. LOUIS, MISSOURI.

MACHINE FOR MAKING SHEET-GLUE.

1,311,571.

Specification of Letters Patent.   Patented July 29, 1919.

Application filed November 21, 1918.   Serial No. 263,570.

*To all whom it may concern:*

Be it known that I, ROY MORGAN, a citizen of the United States, residing in the city of St. Louis and State of Missouri, have invented new and useful Improvements in Machines for Making Sheet-Glue, of which the following is a specification.

This invention has for its general object to provide a machine for making sheet glue which shall be simple in construction, effective and reliable in operation and economical of manufacture.

Among the detailed objects of the invention are a novel construction and operation of the glue-spreading device; and a novel construction and operation of a glue gathering device.

Other objects of the invention relate to details of construction, and to combinations and operations of parts, as will hereinafter more clearly appear.

An embodiment of the invention in the form best known to me is shown in the accompanying drawing, in which:—

Figure 1 is a view mainly in side elevation and partly in broken section, of a machine constructed according to my invention;

Fig. 2 is a plan view of the machine; and

Fig. 3 is a broken sectional view on a slightly enlarged scale, illustrating more particularly the gathering roller and co-acting scraper.

Referring to the drawing, the numeral 1 indicates a table of considerable length as compared with its width and which is supported on cross-beams 2 which in turn may rest upon the floor of the factory. The upper portion of the table is hollow, as indicated at 3, for the purpose of forming a chamber extending throughout the length of the table for containing a cooling fluid, such as brine, which may flow in at one end, as indicated at 4 and out at the other end, as indicated at 5. The top of the table is preferably formed of a plate of glass, as indicated at 6, extending along the sides of which are ledges 7 for confining the fluid glue on the top of the table. Supported on the cross-beams 2 on opposite sides of the table 1, and at a distance therefrom, are rails 8 for the wheels 9 of the carriage 10. The carriage comprises uprights 11, preferably four in number, and located in pairs on opposite sides of the table, which support, at a suitable distance above the table a tank 12 for containing liquid glue. Extending from the bottom of said tank, and communicating with the interior thereof, is a pipe 13 having a valve 14 provided with an operating handle 15. On the bottom of the pipe 13 is a spreader, which comprises a branch-pipe 16 of substantially the width of the table 1 and communicating centrally of its length with the pipe 13 and provided throughout its length with a series of faucets 17. On the rear end of the carriage, and on opposite sides thereof, are mounted plates 18, each of which is provided with a deep groove 19 and a shallow groove 20, said grooves being adapted to receive the end trunnions 21 of a gathering roller 22. Mounted on the rear uprights 11 is a hinged scraper 23, which is preferably curved concentrically with the roller 22. The carriage 10 with the parts just described mounted thereon is moved back and forth over the table 1 by means of sprocket chains 24, located on either side of the table and to which the carriage is connected by means of extensions 25 having their ends secured to said chains. The chains 24 are mounted and operated in the following manner:—

Mounted in bearings 26 at either end of the table are shafts 27 provided at their ends with sprocket-wheels 28 for receiving and actuating the chains 24. The shaft 27 at the forward end of the machine is provided with a pulley 29 which is driven by a belt 30 from a motor 31. One of the chains 24 is provided at the proper interval with two stops, 32, 33, respectively. Mounted on the same side of the machine as this chain is a two-way switch 34, having contact points, 35 and 37, respectively, and having a pivoted switch-arm 38 provided with a contact end 36, and a free end of which is in the line of movements of the stops 32 and 33.

The operation of the machine as thus far described is as follows:

The carriage 10 being in the position shown in Fig. 1, the operator turns the switch 38 to cause its upper end 36 to make engagement with the contact 37. This places the motor in operation, and the carriage 10 is drawn by the chains 24 over the rails 8 until it reaches the forward end of the table, whereupon the stop 33 will engage the switch arm 38 and turn the latter out of engagement with the contact 37 to the neutral position shown in Fig. 1, thereby stopping the operation of the motor. During this movement of the carriage the roller 22 will be supported by its trunnions in the shallow grooves 20, the scraper 23 having previously been turned to the position shown in dotted lines in Fig. 1 and being held in such position by the roller.

The operator now manually turns the switch arm 38 to make engagement of its end 36 with the contact point 35, whereby the motor will again be placed in operation, but so as to turn in the opposite direction to that first described and thereby move the carriage toward the rear of the machine until the switch arm 38 is engaged by the stop 32 and again brought to neutral position. After the carriage has moved a short distance toward the rear end of the table the handle 15 is then operated to open the valve 14, and a desired number of the faucets 17 being already open, the glue flows out on the glass top 6 and forms a fairly uniform sheet. When the carriage is brought to a stop at the rear end of the table the valve 14 is closed and the switch arm is then operated as first above noted to cause the carriage 10 to be moved back to the front end of the table. During this time the sheet of glue is cooled.

After the carriage reaches the front end of the table the scraper 23 is lowered so as to rest upon the glass top 6 and the roller 22 is placed with its trunnions in the deep grooves 19. The carriage is now started toward the rear of the table and the scraper 23 lifts the sheet of glue and turns it over on the roller 22 as the latter is rotated by frictional contact with said sheet. The sheet is thus caused to be wound upon said roller, as indicated more clearly in Fig. 3. During this time the faucets 17 are opened so that a new sheet of glue is being laid as the one is being taken off the table. It being understood that by the time the carriage is brought again to the front end of the machine the layer of glue has sufficiently cooled to form a semi-plastic sheet which is removed in the manner just above described.

At the rear of the machine there is a supplemental structure comprising, essentially, two side rails 39 and uprights 40, the latter projecting above the rails 39 to form stops 41. On the end of the rear shaft 27 there is secured a gear 42 which is in mesh with a gear 43 secured on the end of the shaft 44 which is mounted in bearings 45 extending beyond the rear end of the machine. On the shaft 44 is a roller 46, over which, and a corresponding, suitably-supported idle roller (not shown) is passed an endless belt 47.

The carriage having been moved to the position shown in Fig. 1, with a sheet of glue wound upon the roller 22 as described, the said roller is now lifted out of the grooves 19 and its trunnions placed on the rail 39 and rolled along said rails until brought to a stop by engagement with the stops 41. A tray 48 is placed upon the endless carrier 47, another roller 22 is placed with its trunnions in the shallow grooves 20, and the switch arm 38 is turned to start the motor in operation and again return the carriage toward the front end of the machine for a new sheet removing and spreading operation. In this movement of the sprocket chains the engagement of the gear 42 with the gear 43 will cause the endless conveyer 47 to move outward, as to its upper portion. In this movement the end of the sheet of glue, indicated by the numeral 49, is placed on the forward end of the tray 48 and as the tray 48 is moved outward by the conveyer the sheet of glue is laid upon said tray. When the desired length is wound off, that is to say, a length of glue corresponding to the length of the tray 48, the operator severs the glue with a knife and inserts another tray on the conveyer, and the preceding operation is repeated. As the conveyer 47 travels at the same rate as chains 24, all of the glue will be unwound from the roller 22 by the time the carriage 10 has again reached the forward end of the table.

I claim:—

1. In a machine for making sheet glue, in combination with a table, a tank movable forward and rearward thereover and provided with a spreader for depositing glue upon the table in the rearward movement of the tank, a roller movable with said tank in its rearward movement in frictional engagement with the layer of glue deposited on the table, and a scraper also movable with said tank and operating in the rearward movement thereof to lift the sheet of glue and turn it into contact with said roller.

2. In a machine for making sheet glue, in combination with a table, a carriage, a tank supported by said carriage and movable forward and rearward over said table, a spreader carried by said tank for depositing glue on the table in the rearward movement of the carriage, a gathering roller removably mounted on said carriage in frictional engagement with the layer of glue deposited on the table, and a scraper mounted on said carriage and operating in the rearward movement thereof to lift the sheet of glue and turn it into contact with said roller.

3. A machine for making sheet glue according to claim 2, in which the gathering roller is provided at its end with trunnions and the carriage with holders having open end slots for loosely receiving said trunnions and of a depth to permit the roller when positioned thereon to rest upon the sheet of glue.

4. A machine for making sheet glue according to claim 2, in which the gathering roller is provided at its end with trunnions, and the carriage with holders having open end slots for loosely receiving said trunnions, and of a depth to permit the roller when positioned therein to rest upon the sheet of glue, said holders also having shallow open end slots of a depth when the roller is positioned therein to hold it out of contact with the table.

5. A machine for making sheet glue according to claim 2, in which the scraper is curved substantially concentrically with the gathering roller.

6. In a machine for making sheet glue, in combination with a table, a carriage, a tank supported by said carriage and movable forward and rearward over said table, a spreader carried by said tank for depositing glue on the table in the rearward movement of the carriage, a gathering roller removably and yieldably mounted on said carriage and adapted, in operation, and in the rearward movement of the carriage, to rest upon and be rotated by engagement with the layer of glue deposited on the table, and a scraper mounted on said carriage and operating in the rearward movement thereof to lift the sheet of glue and turn it into contact with said roller.

7. A machine for making sheet glue according to claim 6 having a supplemental frame projecting from the rear of the table comprising rails, whereby at the end of the rearward movement the roller with the glue wound thereon may be removed from the carriage and its trunnions mounted on said rails and rolled thereover to a suitable point for removing the sheet glue from the roller.

8. A machine for making sheet glue according to claim 6 having a supplemental frame extending from the rear end of the table comprising side rails having stops at their rear ends, whereby the roller with the sheet of glue wound thereon may be removed from said carriage and its trunnions placed on said rails and rolled thereover until brought to rest against said stops in position to have the sheet glue unwound therefrom.

9. In a machine for making sheet glue, in combination with a table, rails mounted at either side of said table, a carriage mounted on said rails, a tank supported by said carriage and having a width substantially equal to that of the table, means for moving said carriage in either direction to cause the tank to be moved forward and rearward over said table, a spreader carried by said tank for depositing glue on the table in the rearward movement of the carriage, automatic means for stopping the carriage at the terminus of its moveemnt in either direction, a gathering roller removably mounted on said carriage and adapted to maintain frictional contact in the rearward movement of the carriage with the layer of glue deposited on the table, and a scraper mounted on said carriage and operating in said rearward movement to lift the sheet of glue and turn it into contact with said roller.

In testimony whereof I have hereunto set my hand.

ROY MORGAN.